(12) United States Patent
Mischo et al.

(10) Patent No.: US 12,742,414 B2
(45) Date of Patent: Sep. 22, 2026

(54) DEVICE FOR GENERATING ENERGY FROM COMPRESSED AIR, SYSTEM HAVING SUCH A DEVICE AND METHOD FOR OPERATING THE SYSTEM

(71) Applicant: MAN Energy Solutions SE, Augsburg (DE)

(72) Inventors: Bob Mischo, Zollikerberg (CH); Dominik Schlageter, Rafz (CH); Andreas Felix Villinger, Rafz (CH); Tyler Paul Pelkey, Opfikon (CH); Florian Stalzer, Wetzikon (CH)

(73) Assignee: EVERLLENCE SE, Augsburg (DE)

( * ) Notice: Subject to any disclaimer, the term of this patent is extended or adjusted under 35 U.S.C. 154(b) by 0 days.

(21) Appl. No.: 18/978,282

(22) Filed: Dec. 12, 2024

(65) Prior Publication Data

US 2025/0207530 A1 Jun. 26, 2025

(30) Foreign Application Priority Data

Dec. 21, 2023 (DE) ..................... 10 2023 136 277.1

(51) Int. Cl.

*F02C 6/16* (2006.01)
*F01D 15/10* (2006.01)
*F02C 1/00* (2006.01)
*F02C 3/00* (2006.01)

(52) U.S. Cl.

CPC ................ *F02C 6/16* (2013.01); *F01D 15/10* (2013.01); *F02C 1/007* (2013.01); *F02C 3/00* (2013.01)

(58) Field of Classification Search

CPC .... F02C 6/16; F02C 1/007; F02C 3/00; F02C 6/14; F02C 6/18; F02C 7/10; F02C 1/04; F02C 6/02; F02C 6/12; F02C 7/08; F01D 15/10; F01D 25/24; F05D 2220/76;

(Continued)

(56) References Cited

U.S. PATENT DOCUMENTS 3,797,234 A * 3/1974 Schwarz .................. F02C 1/06 60/39.183
4,043,120 A * 8/1977 Hoffeins .................. F02C 6/16 60/39.511

(Continued)

FOREIGN PATENT DOCUMENTS

DE 1032603 6/1958
DE 2116851 10/1972
GB 2618583 A * 11/2023 ................ F02C 6/16

OTHER PUBLICATIONS

European Search Report of corresponding European Patent Application No. 24210063.4, dated Apr. 2, 2025.

*Primary Examiner* — Jesse S Bogue
(74) *Attorney, Agent, or Firm* — COZEN O"CONNOR

(57) ABSTRACT

A device for generating energy from compressed air, having an air turbine for expanding gaseous air starting out from a first pressure level to a second pressure level and in the process produce first energy, a combustion chamber for receiving the air expanded in the air turbine and combust fuel in the same, and an exhaust gas turbine for expanding exhaust gas generated during the combustion of the fuel in the combustion chamber and in the process produce second energy. At least the air turbine and the exhaust gas turbine have a common housing.

12 Claims, 3 Drawing Sheets

(58) Field of Classification Search
CPC .. F05D 2260/213; F05D 2260/42; F01K 7/16; F01K 25/08
See application file for complete search history.

(56) References Cited

U.S. PATENT DOCUMENTS

| | | | | |
|---|---|---|---|---|
| 6,276,123 | B1 * | 8/2001 | Chen | F02C 6/16 60/727 |
| 6,708,500 | B2 * | 3/2004 | Huster | F01D 25/164 60/797 |
| 7,406,828 | B1 * | 8/2008 | Nakhamkin | F02C 7/10 60/727 |
| 7,614,237 | B2 * | 11/2009 | Nakhamkin | F02C 6/14 60/727 |
| 7,669,423 | B2 * | 3/2010 | Nakhamkin | F23J 15/08 60/727 |
| 9,217,370 | B2 * | 12/2015 | Wang | F02C 7/32 |
| 9,938,895 | B2 * | 4/2018 | Kerth | F02C 6/16 |
| 11,073,080 | B2 * | 7/2021 | Conlon | F02C 6/16 |
| 11,105,263 | B2 * | 8/2021 | Francini | F02C 6/06 |
| 2003/0033812 | A1 * | 2/2003 | Gerdes | F02C 6/16 60/772 |
| 2014/0096523 | A1 | 4/2014 | Coney | |
| 2014/0137563 | A1 | 5/2014 | Kerth et al. | |

* cited by examiner 10
11
12
13
14
15
16
17
18
19
20
21
22
A1
A2
A3
K
L1
L2
L3
L4

DEVICE FOR GENERATING ENERGY FROM COMPRESSED AIR, SYSTEM HAVING SUCH A DEVICE AND METHOD FOR OPERATING THE SYSTEM

BACKGROUND OF THE INVENTION

1. Field of the Invention

The disclosure relates to a device for generating energy from compressed air, a system having such a device, and a method for operating the system.

2. Description of Related Art

From practice, liquid air energy storage (LAES) devices and compressed air energy storage (CAES) devices are known in order to store energy for subsequent use. Accordingly, in a liquid air energy storage device, liquid air is stored in a store which can be evaporated in an evaporator. The evaporated air is then conducted via an air turbine in order to be expanded in the air turbine and in the process generate mechanical energy which can then be utilised for example in order to drive a generator or another machine and thus generate electrical energy. In a compressed air energy storage device, compressed gaseous air is stored which can likewise be conducted via an air turbine in order to again extract mechanical energy in the air turbine which can then be utilised for example for driving a generator thus producing electrical energy. Liquid air energy storage (LAES) devices and compressed air energy storage (CAES) devices known from practice have a limited efficiency. There is a need for a device for generating energy from compressed air which has a higher efficiency.

SUMMARY OF THE INVENTION

One aspect of the invention is a new type of device for generating energy from compressed air, a system having such a device, and a method for operating the system.

The device for generating energy from compressed air comprises an air turbine equipped to expand gaseous air starting out from a first pressure level to a second pressure level and produce first energy in the process.

The device for generating energy from compressed air, further, comprises a combustion chamber equipped for receiving the air expanded in the air turbine and combust fuel in the same.

The device for generating energy from compressed air, further, comprises an exhaust gas turbine equipped for expanding exhaust gas created during the combustion of the fuel in the combustion chamber and produce second energy in the process.

At least the air turbine and the exhaust gas turbine have a common housing.

With the help of the device for generating energy from compressed air according to one aspect of the invention, energy with high efficiency can be produced from compressed air, which is provided for example by a liquid air energy storage (LAES) device or a compressed air energy storage (CAES) device. In the process, the compressed air is initially expanded in the air turbine to a first pressure level and subsequently fed to the combustion chamber, in which in the presence of the air expanded to the first pressure level, a fuel is combusted and exhaust gas thus generated, which is conducted via an exhaust gas turbine in order to thus generate further energy. Accordingly, both in the air turbine and also in the exhaust gas turbine energy is created, namely mechanical energy, which can be utilised for example in order to drive a generator for generating electrical energy.

Compared with a simple air turbine, more than double the effective power can be generated with the device according to one aspect of the invention. Accordingly, energy can be produced with high efficiency from compressed air.

Preferentially, the air turbine, the combustion chamber, and the exhaust gas turbine comprise the common housing. Alternatively, the air turbine and the exhaust gas turbine comprise the common housing and the combustion chamber a separate housing. In particular when the air turbine, the combustion chamber, and the exhaust gas turbine comprise a common housing, the device can be embodied in a particularly compact manner with low installation space requirement and low weight. Thus, the arrangement of air turbine, combustion chamber and exhaust gas can be particularly flexibly efficient in a liquid air energy storage (LAES) device or a compressed air energy storage (CAES) device. In particular when the combustion chamber is arranged in a separate housing, the installation space requirement and the weight of the device increase but thermal stresses on the common housing of the air turbine and of the exhaust gas turbine can be reduced.

Preferentially, the device for generating energy from compressed air comprises a first heat exchanger connected between the air turbine and the combustion chamber, via which on the one hand the air expanded in the air turbine and the air to be fed to the combustion chamber and on the other hand the exhaust gas expanded in the exhaust gas turbine can be conducted in order to heat the air expanded in the air turbine upstream of the combustion chamber. Through the first heat exchanger, the temperature of the air expanded in the first air turbine is increased as a result of which the fuel quantity required in the combustion chamber can be reduced. Accordingly, the efficiency of the device according to one aspect of the invention can be further increased.

Preferentially, the device for generating energy from compressed air comprises a second heat exchanger connected upstream of the air turbine, via which on the one hand the air to be expanded in the air turbine and on the other hand the exhaust gas expanded in the exhaust gas turbine can be conducted in order to heat the air to be expanded in the air turbine upstream of the air turbine. By way of the second heat exchanger connected upstream of the air turbine, the efficiency of the device for generating energy from compressed air can also be further increased. Accordingly, by increasing the temperature of the air to be expanded in the air turbine more energy can be produced in the air turbine.

Preferentially, the air turbine and the exhaust gas turbine are oriented in a back to back arrangement in such a manner that the inlet sides of the two turbines are directed away from one another and the outlet sides of the two turbines face one another. The back to back arrangement of the two turbines allows an advantageous thermal equalisation of the common housing of at least air turbine and exhaust gas turbine to a shaft, which is driven by the air turbine and exhaust gas turbine. Alternatively, the air turbine and the exhaust gas turbine are oriented in an inline arrangement in such a manner that an outlet side of one of the two turbines faces an inlet side of another of the two turbines.

A system according to one aspect of the invention comprises the device for generating energy from compressed air and preferentially a liquid air energy storage (LAES) device according to the invention, which comprises a store for storing liquid air and an evaporator for evaporating the liquid air, wherein the evaporated air can be fed to the air turbine as gaseous, compressed air. The device for generating energy from compressed air according to one aspect of the invention is preferentially employed combined with a liquid air energy storage (LAES) device in order to produce energy from liquid air.

Alternatively, to a liquid air energy storage (LAES) device, the system according to one aspect of the invention can also comprise a compressed air energy storage (CAES) device.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

Figure 1:
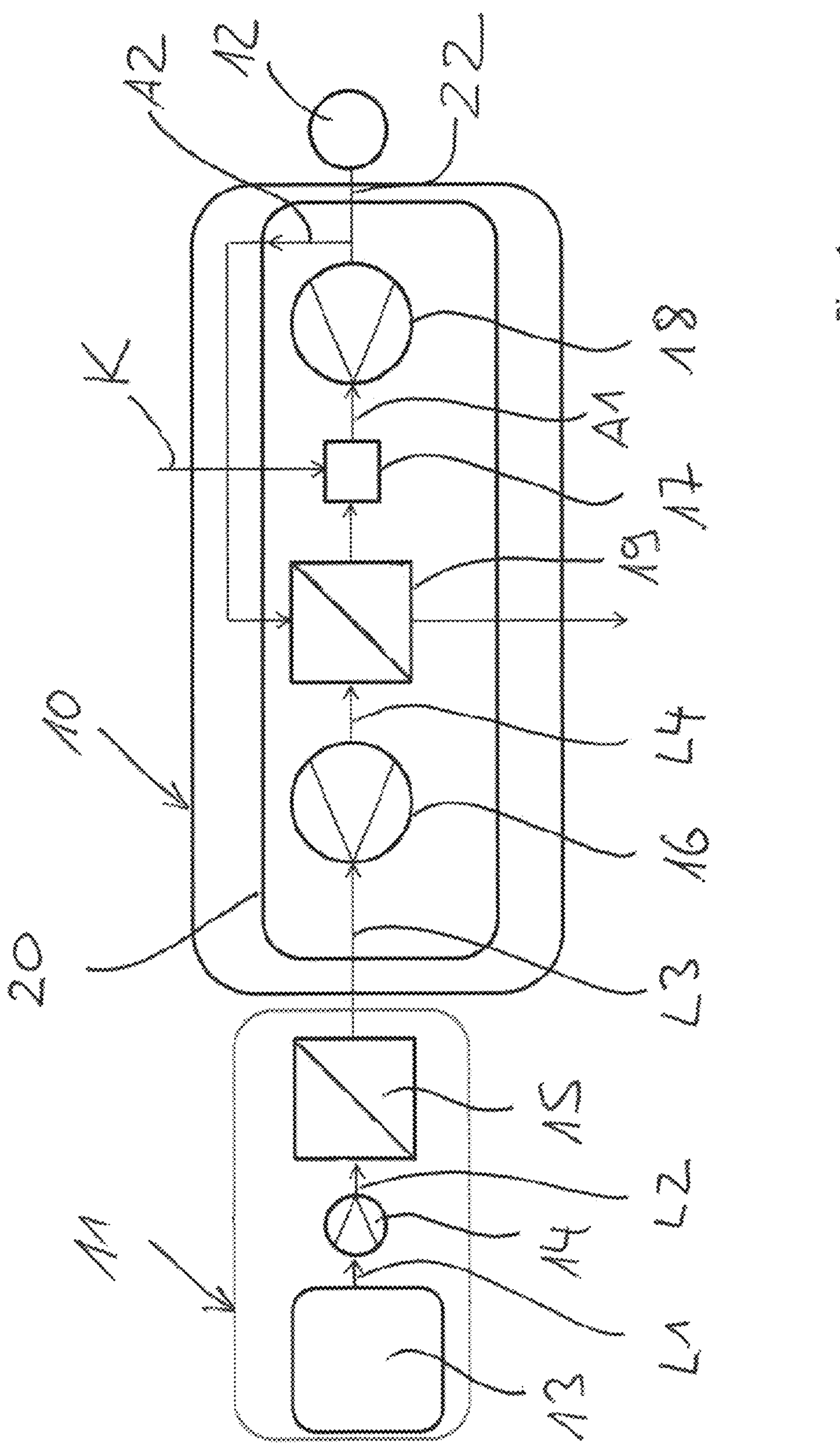
FIG. 1: is a first system having a device for generating energy from compressed air.

The disclosure relates to a device 10 for generating energy from compressed air. FIG. 1 shows a device 10 according to one aspect of the invention in connection with a liquid air energy storage (LAES) device 11 and an electric machine 12.

The LAES device 11 has a store 13 for storing liquid air. Further, the LAES device 11 in the shown example comprises a pump 14 which is equipped for providing an evaporator 15 of the LAES device 11 with the liquid air. In the evaporator 15, the liquid air can be evaporated in order to thereby provide compressed gaseous air from which energy can then be produced with the help of the device 10, which energy is utilised for example in FIG. 1 in order to drive the electric machine 12.

The pump 14 is optional with an LAES device 11. The liquid air can also be extracted from the store 13 and fed to the evaporator 15 in another manner. In particular when a pump 14 is present, the same can be embodied as cryopump.

The device 10 for generating energy from compressed air according to one aspect of the invention comprises an air turbine 16. The air turbine 16 is equipped for expanding the compressed air from a first pressure level to a second pressure level and produce first energy in the process.

Further, the device 10 for generating energy from compressed air according to one aspect of the invention comprises a combustion chamber 17. The combustion chamber 17 is equipped for receiving the air expanded in the air turbine 16 and in the presence of the air combust a fuel in the same and in the process generate exhaust gas. The fuel to be combusted is ignited in the combustion chamber 17.

The device 10 for generating energy from compressed air according to one aspect of the invention furthermore comprises an exhaust gas turbine 18. The exhaust gas turbine 18 is equipped for expanding the exhaust gas generated in the combustion chamber 17 during the combustion of the fuel and produce second energy in the process.

Preferentially, the air turbine 16 and the exhaust gas turbine 18 drive a common shaft 22 and, via the common shaft 22, jointly the electric machine 12. In the process, the electric machine 12 is preferentially operated as a generator in order to thus provide electrical energy.

According to FIG. 1, liquid air L1 is accordingly extracted from the store with the help of the pump 14, which is provided to the evaporator 15 by the pump 14 as liquid air L2. Downstream of the evaporator 15, gaseous, compressed air L3 is present which flows via the air turbine 16, wherein gaseous air L4 expanded to the second pressure level leaves the air turbine 16. The air L4 present at the second pressure level is fed to the combustion chamber 17, namely together with fuel K, wherein during the combustion of the fuel K exhaust gas is generated, which as exhaust gas A1 leaves the combustion chamber 17 and is expanded in the exhaust gas turbine 18. Expanded exhaust gas A2 is discharged from the exhaust gas turbine 18.

In FIG. 1, device 10 includes a first heat exchanger 19, which is connected between the air turbine 16 and the combustion chamber 17. On the one hand, the air L4 expanded in the air turbine and on the other hand the exhaust gas A2 expanded in the exhaust gas turbine 18 is conducted via this first heat exchanger 19 in order to thus transfer thermal energy of the exhaust gas A2 to the expanded air L4 and thus increase the temperature of the expanded air upstream of the combustion chamber 17. By way of this, the efficiency of the device 10 for generating energy from compressed air according to the invention can be increased.

Figure 2:
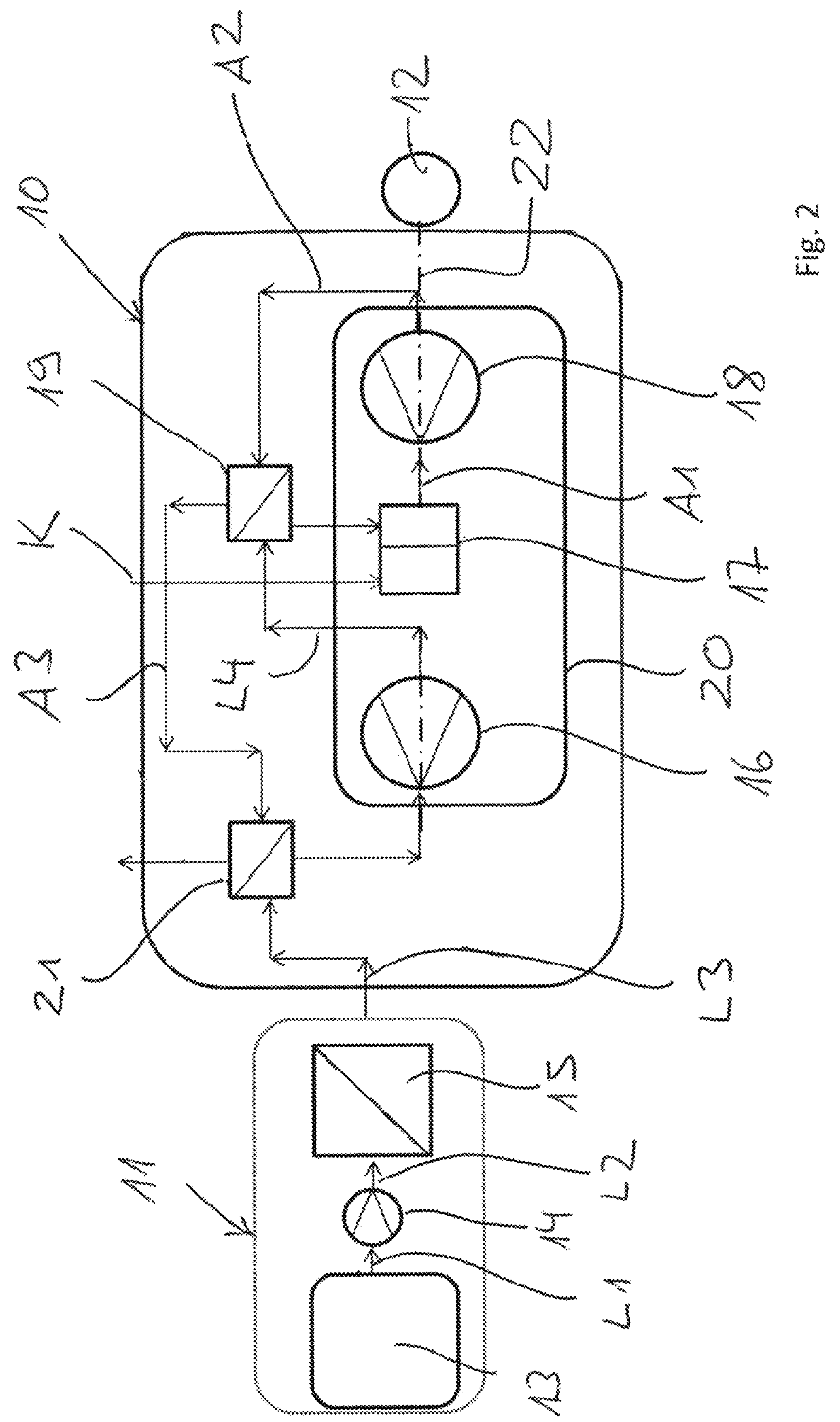
FIG. 2: is a second system having a second device for generating energy from compressed air.

FIG. 2 shows a block diagram of a second device 10 according to one aspect of the invention for generating electrical energy from compressed air again together with the LAES device 11, wherein for avoiding unnecessary repetitions in FIG. 2, same reference numbers as in FIG. 1 are used for same assemblies and reference is made to the explanations regarding FIG. 1 in this regard. In the following, only such details are discussed by which the exemplary embodiment of FIG. 2 differs from the exemplary embodiment of FIG. 1.

In FIG. 1, the air turbine 16, the exhaust gas turbine 18, the combustion chamber 17 and the first heat exchanger 19 have a common housing 20. Thus, a particularly compact space-saving and weight-reduced design can be ensured. In FIG. 2, by contrast, merely the air turbine 16, the exhaust gas turbine 18 and the combustion chamber 17 have the common housing 20, while the first heat exchanger 19 is not integrated in the common housing 20, but rather embodied as separate assembly with a separate housing.

A further difference from FIG. 2 to FIG. 1 is that the exhaust gas A2 conducted via the first heat exchanger 19, which was expanded in the exhaust gas turbine 18, is subsequently conducted as exhaust gas A3 via a second heat exchanger 21, which seen in the flow direction of the air expanded in the air turbine 16 is arranged upstream of the air turbine 16. On the one hand, the compressed, gaseous air L3 and on the other hand the exhaust gas A3 is conducted via this second heat exchanger 21 in order to heat the air L3 to be expanded in the air turbine 16 upstream of the air turbine 16. The efficiency can also be further increased by this.

Figure 3:
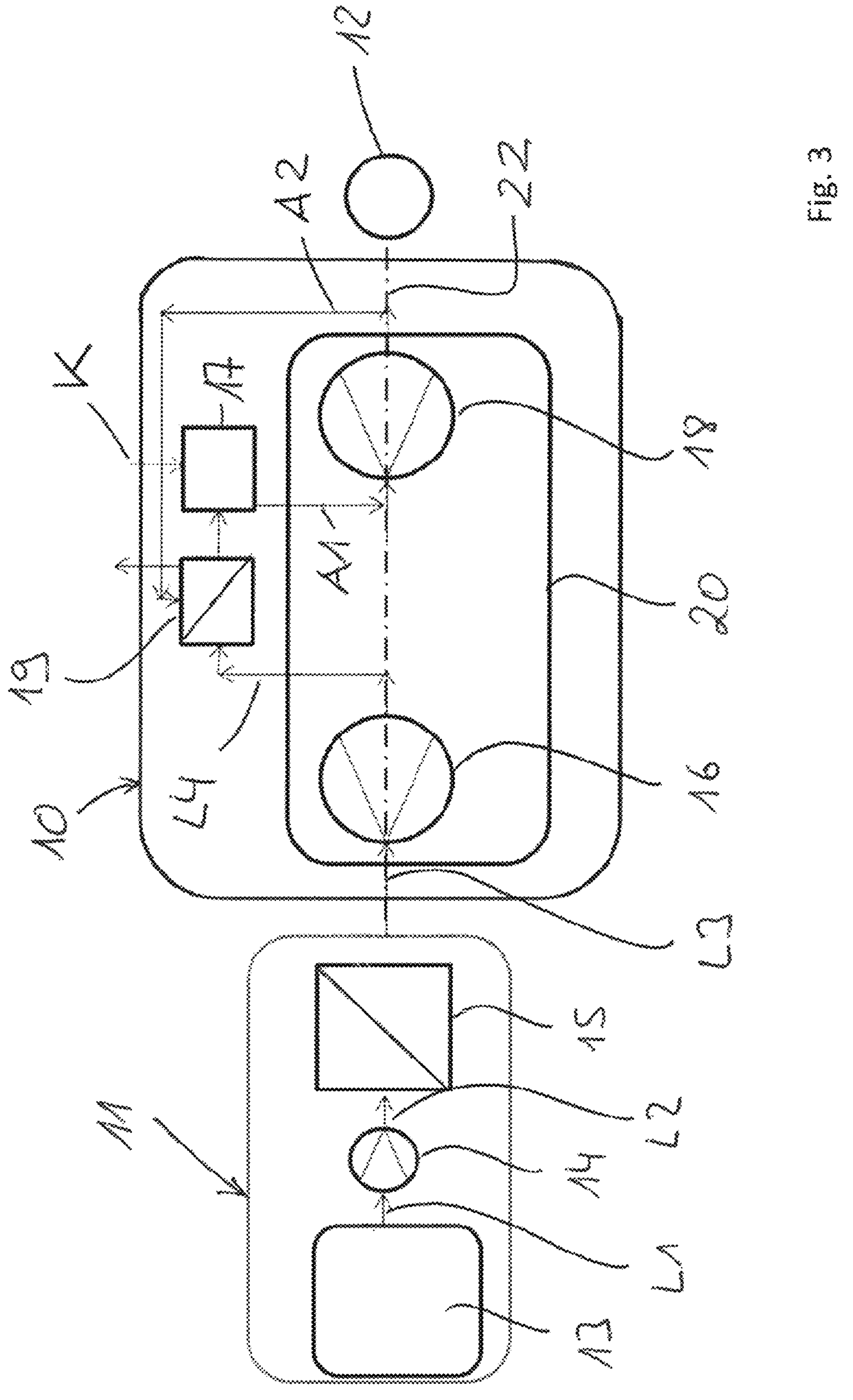
FIG. 3: is a third system having a third device for generating energy from compressed air.

A further device 10 for generating energy from compressed air according to one aspect of the invention is shown by FIG. 3, wherein in FIG. 3 the LAES device 11 is also again shown and for avoiding unnecessary repetitions, same reference numbers as in FIG. 1 are used for same assemblies and in the following only such details are discussed by which the exemplary embodiment of FIG. 3 differs from FIG. 1.

In FIG. 3, merely the air turbine 16 and the exhaust gas turbine 18 have a common housing 20. In FIG. 3, both the first heat exchanger 19 and also the combustion chamber 17 are not integrated in the common housing 20 but embodied as separate assembly with a separate housing. By way of this, the common housing 20 of air turbine 16 and exhaust gas turbine 18 is subjected to a lower thermal load than in FIG. 1 and likewise as in FIG. 2 so that thermal deformations can be reduced. This is advantageous for the shaft 22 driven by the two turbines 16, 18, via which shaft 22 the electric machine 12 is driven.

With the invention present here, compressed, gaseous air L3, which is provided by the LAES device 11, is expanded to a pressure level of a combustion chamber pressure of the combustion chamber 17.

The compressed, gaseous air can also be provided by a compressed air energy storage (CAES) device.

With a CAES device, the evaporator 15 is obsolete. Instead of the pump 14, a compressor can be present with a CAES device.

The air fed to the combustion chamber 17 is utilised in order to combust fuel K in the combustion chamber 17, wherein in the process in the combustion chamber 17 the exhaust gas A1 is created, which is conducted via the exhaust gas turbine 18 for expansion. Both in the air turbine 16 and also in the exhaust gas turbine 18 mechanical energy is accordingly produced in each case which is utilised for driving a preferentially common shaft 22 of an electric machine 12 preferentially in the form of a generator in order to thus generate electrical energy.

Through the combustion of the fuel K, thermal energy is thus fed to the air expanded in the air turbine 16, wherein the exhaust gas A1 is expanded in the exhaust gas turbine 18 to ambient pressure. Residual heat of the exhaust gas A2 can be utilised in at least one heat exchanger 19, 21 in order to heat the air LA expanded in the air turbine 16 and/or the air L3 to be expanded in the air turbine 16.

With the invention, significantly more power can be output than is possible by a pure air turbine combined with an LAES device or a CAES device. Accordingly, roughly more than twice the power can be output.

In the exemplary embodiments of FIGS. 1 to 3, the heat of the exhaust gas can be utilised for preheating the fuel K.

Alternatively or additionally, it is also possible to conduct the exhaust gas, which leaves the exhaust gas turbine 18, via the evaporator 15 with an LAES device 11 in order to thus utilise heat of the exhaust gas in the region of the evaporator 15.

In particular when an LAES device 11 is present, the liquid air can be used for cooling assemblies such as for example the combustion chamber 17, thus making possible a higher combustion temperature or operating temperature. Alternatively, or additionally, liquid air can be utilised in order to regulate air or exhaust gas temperatures or mass flows and/or in order to optimise the combustion of the fuel and/or reduce emissions.

Preferentially, the air turbine 16 and the exhaust gas turbine 18 are oriented in a back to back arrangement in such a manner that the inlet sides of the two turbines 16, 18 are directed away from one another and the outlet sides of the two turbines 16, 18 face one another. This back to back arrangement of the two turbines 16, 18 is not shown in FIGS. 1 to 3, the same allows an advantageous thermal equalisation of the common housing of at least air turbine 16 and exhaust gas turbine 18 to a shaft 22, which is driven by the air turbine 16 and exhaust gas turbine 18.

The invention allows producing energy with high efficiency from compressed air.

The invention, furthermore, relates to a method for operating the system of the device 10, the CAES device or LAES device 11 and the electric machine 12 which is coupled to an electrical power network.

In particular when the network frequency of the electrical power network is smaller than a setpoint value, the electric machine 12 is operated as generator for network stabilisation of the electrical power network. In this case, for the network stabilisation, mechanical energy produced in the device 10 in a production phase of electrical energy is converted into electrical energy and fed into the power network. In this case, the CAES device or LAES device 11 is connected to the device 10.

In particular when a network frequency of the electrical power network is greater than a setpoint value, the electric machine 12 is operated as a motor for the network stabilisation of the electrical power network. In this case, electrical energy is converted into power loss for the network stabilisation. In this case, the CAES device or LAES device 11 is preferentially disconnected from the device 10. In particular when the CAES device or the LAES device 11 is disconnected from the device 10, the electric machine 12 is preferentially operated at minimal rotational speed in order to change within a very short time into a next production phase of electrical energy.

Accordingly, the invention also relates to the use of the system of the device 10, the CAES device or LAES device 11 and of the electric machine 12 for network stabilisation of an electrical power network, to which the electric machine 12 is connected.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device configured to generate energy from compressed air, comprising:

an air turbine configured to expand gaseous air starting out from a first pressure level to a second pressure level and produce first energy;

a combustion chamber configured to receive air expanded in the air turbine and combust fuel;

an exhaust gas turbine configured to expand exhaust gas created during combustion of the fuel in the combustion chamber and produce second energy; and a common housing for at least the air turbine and the exhaust gas turbine, wherein the air turbine and the exhaust gas turbine are oriented in a back to back arrangement such that inlet sides of the two turbines are directed away from one another and outlet sides of the two turbines face one another.

2. The device according to claim 1, wherein the common housing additionally for the combustion chamber.

3. The device according to claim 1, wherein the combustion chamber has a separate housing.

4. The device according to claim 1, further comprising:

a first heat exchanger connected between the air turbine and the combustion chamber, via which the air expanded in the air turbine and to be fed to the combustion chamber and the exhaust gas expanded in the exhaust gas turbine can be conducted to heat the air expanded in the air turbine upstream of the combustion chamber.

5. The device according to claim 4, further comprising:

a second heat exchanger connected upstream of the air turbine, via which the air to be expanded in the air turbine and the exhaust gas expanded on the exhaust gas turbine can be conducted to heat the air expanded in the air turbine upstream of the air turbine.

6. The device according to claim 5, wherein the first heat exchanger is configured to receive the exhaust gas expanded in the exhaust gas turbine and subsequently making the same available to the second heat exchanger.

7. A device configured to generate energy from compressed air, comprising:

an air turbine configured to expand gaseous air starting out from a first pressure level to a second pressure level and produce first energy;

a combustion chamber configured to receive air expanded in the air turbine and combust fuel;

an exhaust gas turbine configured to expand exhaust gas created during combustion of the fuel in the combustion chamber and produce second energy;

a common housing for at least the air turbine and the exhaust gas turbine; and a first heat exchanger arranged in the common housing connected between the air turbine and the combustion chamber, via which the air expanded in the air turbine and to be fed to the combustion chamber and the exhaust gas expanded in the exhaust gas turbine can be conducted to heat the air expanded in the air turbine upstream of the combustion chamber.

8. The device according to claim 1, wherein the air turbine and the exhaust gas turbine are oriented in an inline arrangement such that an outlet side of one of the two turbines faces an inlet side of another of the two turbines.

9. A system comprising:

an air turbine configured to expand gaseous air starting out from a first pressure level to a second pressure level and produce first energy;

a combustion chamber configured to receive air expanded in the air turbine and combust fuel;

an exhaust gas turbine configured to expand exhaust gas created during combustion of the fuel in the combustion chamber and produce second energy;

a common housing for at least the air turbine and the exhaust gas turbine; and a liquid air energy storage device, which comprises a store for storing liquid air and an evaporator for evaporating the liquid air, wherein evaporated air can be fed to the air turbine, wherein the air turbine and the exhaust gas turbine are oriented in a back to back arrangement such that inlet sides of the two turbines are directed away from one another and outlet sides of the two turbines face one another.

10. A system comprising:

a device configured to generate energy from compressed air comprising:

an air turbine configured to expand gaseous air starting out from a first pressure level to a second pressure level and produce first energy;

a combustion chamber configured to receive air expanded in the air turbine and combust fuel;

an exhaust gas turbine configured to expand exhaust gas created during combustion of the fuel in the combustion chamber and produce second energy; and a common housing for at least the air turbine and the exhaust gas turbine; and a compressed air energy storage device which comprises a store for storing compressed gaseous air, wherein the compressed gaseous air can be fed to the air turbine, wherein the air turbine and the exhaust gas turbine are oriented in a back to back arrangement such that inlet sides of the two turbines are directed away from one another and outlet sides of the two turbines face one another.

11. The system according to claim 10, further comprising:

an electric machine coupled to the device that can be operated as a motor and as a generator.

12. A method for operating a system having a device configured to generate energy from compressed air comprising:

an air turbine configured to expand gaseous air starting out from a first pressure level to a second pressure level and produce first energy;

a combustion chamber configured to receive air expanded in the air turbine and combust fuel;

an exhaust gas turbine configured to expand exhaust gas created during combustion of the fuel in the combustion chamber and produce second energy; and a common housing for at least the air turbine and the exhaust gas turbine, wherein the air turbine and the exhaust gas turbine are oriented in a back to back arrangement such that inlet sides of the two turbines are directed away from one another and outlet sides of the two turbines face one another;

a compressed air energy storage device which comprises a store for storing compressed gaseous air, wherein the compressed gaseous air can be fed to the air turbine; and an electric machine coupled to the device that can be operated as a motor and as a generator, the method comprising:

operating the electric machine as the motor for network stabilisation of an electrical power network coupled to the electric machine when a network frequency of an electrical power network is greater than a setpoint value; and operating the electric machine as the generator when the network frequency of the electrical power network is smaller than a setpoint value.

* * * * *